United States Patent [19]

Abdulally

[11] Patent Number: 5,101,576
[45] Date of Patent: Apr. 7, 1992

[54] UNI-DIRECTIONAL FLUIDIZATION NOZZLE AND A FLUIDIZED BED SYSTEM UTILIZING SAME

[75] Inventor: Igbal F. Abdulally, Randolph, N.J.

[73] Assignee: Foster Wheeler Energy Corporation, Clinton, N.J.

[21] Appl. No.: 600,789

[22] Filed: Oct. 22, 1990

[51] Int. Cl.⁵ .............................................. F26B 17/00
[52] U.S. Cl. .................... 34/57 R; 34/57 A; 34/57 B
[58] Field of Search ............... 34/57 A, 57 B, 57 R, 34/10; 432/58, 15

[56] References Cited

U.S. PATENT DOCUMENTS 3,921,663  11/1975  Beranek et al. ............... 34/57 A Primary Examiner—Henry A. Bennet
Attorney, Agent, or Firm—Marvin A. Naigur

[57] ABSTRACT

A nozzle for use in a fluidized bed system in which a plate is disposed in an enclosure and is adapted to support particulate material. The nozzle is supported by the plate for receiving air and directing the air through the plate and into the particulate material to fluidize same. The nozzle includes a valve for permitting the flow of air through the nozzle and for preventing the backflow of particulate material.

8 Claims, 2 Drawing Sheets

UNI-DIRECTIONAL FLUIDIZATION NOZZLE AND A FLUIDIZED BED SYSTEM UTILIZING SAME

BACKGROUND OF THE INVENTION

This invention relates to a fluidized nozzle and a fluidized bed system utilizing same and, more particularly, to such a nozzle and system in which a bed of particulate material in an enclosed space is fluidized by the introduction of air into the bed through the nozzle.

Fluidized bed reactors, such as gasifiers, steam generators, combustors, and the like, are well known. In these arrangements, pressurized air or other fluidizing media is passed, via a plurality of nozzles, through a bed of particulate material, including a fossil fuel such as coal and an adsorbent for the sulfur generated as a result of combustion of the coal, to fluidize the bed and to promote the combustion of the fuel at a relatively low temperature. The entrained particulate solids are separated externally of the bed and recycled back into the bed. The heat produced by the fluidized bed is utilized in various applications such as the generation of steam, which results in an attractive combination of high heat release, high sulfur adsorption, low nitrogen oxides emissions and fuel flexibility.

The most typical fluidized bed reactor is commonly referred to as a "bubbling" fluidized bed in which the bed of particulate material has a relatively high density and a well-defined, or discrete, upper surface.

Other types of fluidized bed reactors utilize a "circulating" fluidized bed. According to these processes, the fluidized bed density is well below that of a typical bubbling fluidized bed, the air velocity is greater than that of a bubbling bed and the air entrains a substantial amount of particulate solids and is substantially saturated therewith.

In both the bubbling and circulating fluidized bed arrangements, an air plenum is disposed below an air distributor plate, or grid, for supplying pressurized air to a plurality of air nozzles supported by the plate. The nozzles extend above the plate and into the bed and discharge the air into the bed.

However, the solids from the bed can backflow, or weep, through the nozzles and into the air plenum especially in connection with circulating fluidized beds when the unit is suddenly shut down while operating at full loads. As a result, the solids will accumulate in the air plenum and block air flow through the nozzles. In order to minimize the backflow, the nozzles have to be designed with great care to arrive at the best discharge angle associated with the nozzle diameter, length, bed material characteristics, etc. This is time consuming and expensive, and adds to the overall costs of the system.

This problem is compounded when the discharge angle and direction of the nozzle is especially critical, such as in fluidized beds utilizing directional and/or differential bed fluidization such as disclosed in U.S. Pat. No. 4,397,102 issued Aug. 9, 1983 and assigned to the same assignee as the present invention.

SUMMARY OF THE INVENTION

It is therefore an object of the present invention to provide a fluidization nozzle which introduces air or other fluidizing medium from a plenum into an enclosure containing a bed of particulate material.

It is a further object of the present invention to provide a nozzle of the above type which is designed to reduce or eliminate the backflow of bed materials from the fluidized bed to the air plenum.

It is a further object of the present invention to provide a nozzle of the above type which includes a one-way valve assembly which prevents the backflow of bed material from the fluidized bed to the air plenum.

It is a further object of the present invention to provide a fluidized bed system utilizing a plurality of nozzles of the above type.

Toward the fulfillment of these and other objects, the fluidization nozzle of the present invention is mounted on a distributor plate which supports a bed of particulate material. The nozzle receives air flow from a plenum located below the plate and distributes the air into the bed. The nozzle includes a one-way valve connected for preventing backflow of the bed material to the plenum.

DESCRIPTION OF THE DRAWINGS

The above brief description, as well as further objects, features and advantages of the present invention will be more fully appreciated by reference to the following detailed description of the presently preferred but nonetheless illustrative embodiment in accordance with the present invention when taken in conjunction with the accompanying drawings in which.

DESCRIPTION OF THE PREFERRED EMBODIMENT

Figure 1:
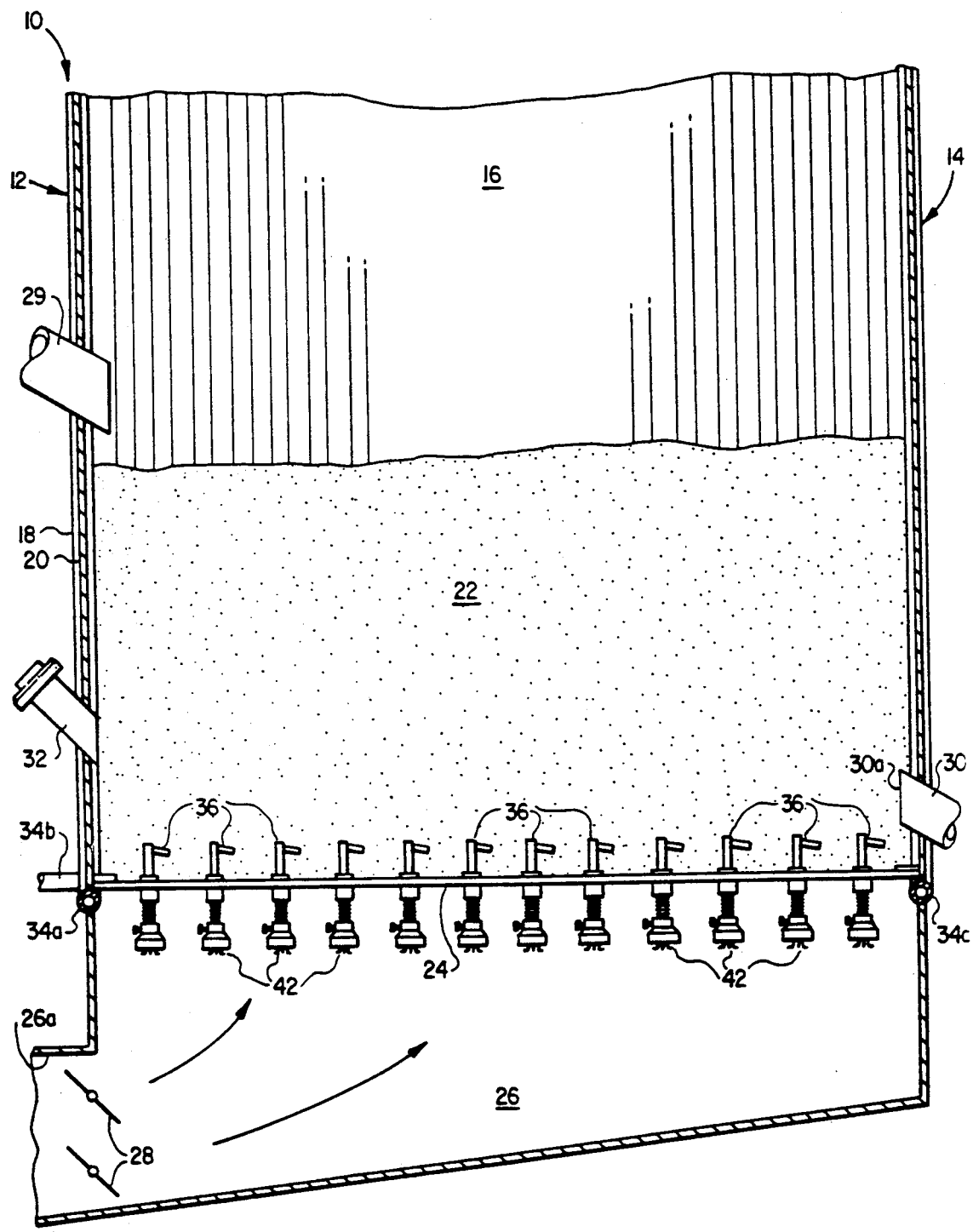
FIG. 1 is a vertical sectional view of a fluidized bed heat exchanger depicting a plurality of fluidizing nozzles of the present invention.

The fluidization nozzle of the present invention will be described in connection with a heat exchanger in the form of a boiler, a combustor, a process reactor or any similar type device utilizing a bubbling fluidized bed. The heat exchanger includes an enclosure 10 consisting of a front wall 12, a rear wall 14, and two sidewalls, one of which is shown by the reference numeral 16. Each wall may be formed by a plurality of vertically-extending tubes 18 disposed in a spaced, parallel relationship and connected together by a plurality of elongated fins 20 extending for the entire lengths of the tubes and connected to diametrically opposed surfaces of the tubes in a conventional manner. The upper portion of the enclosure 10 is not shown for the convenience of presentation, it being understood that it consists of a convection section, a roof and an outlet for allowing the combustion gases to discharge, also in a conventional manner.

A bed of particulate material, shown in general by the reference numeral 22, is disposed within the enclosure 10 and rests on a perforated plate or grid 24 extending horizontally in the lower portion of the enclosure. The bed 22 can consist of a mixture of discrete particles of fuel material such as bituminous coal, and an adsorbent, such as limestone, for adsorbing the sulfur released by the combustion of the fuel material.

An air plenum 26 is provided immediately below the plate 24 and an inlet duct 26a is provided through the plenum for distributing pressurized or distributing pressurized gas, such as air, from an external source air from an external source (not shown) to the plenum under the control of a set of dampers 28.

An overbed feeder 29 extends through the front wall 12, receives particulate coal from inlet ducts or the like (not shown), and is adapted to feed the coal particles onto the upper surface of the bed 22. The feeder 29 can operate by gravity discharge or can be in the form of a spreader-type feeder or any other similar device. It is understood that a feeder can also be provided for discharging the adsorbent onto the bed 22, and would be constructed and arranged in a manner similar to the feeder 32.

A drain pipe 30 extends through the rear wall 14 and has an inlet end portion 30a that registers with the interior of the enclosure 10 in communication with the lower portion of the bed 22. The pipe 30 is thus adapted to receive the spent bed material and functions to discharge the material from the enclosure 10 by gravity to a screw cooler, conveyor belt, or the like (not shown).

A bed light-off burner 32 is provided for initially lighting off the bed during startup in a conventional manner, it being understood that an additional burner (not shown) can be placed in the duct 26a for this purpose.

A pair of horizontal headers 34a are connected in fluid communication with the tubes 18 forming the front wall 12 and the rear wall 14, respectively, and another horizontal header 34b is connected in fluid communication with the tubes 18 forming the sidewall 16. It is understood that similar headers are provided in communication with both ends of the other sidewall and the upper ends of the walls 12 and 14. As a result, a fluid to be heated can be sequentially or simultaneously passed through the walls 12, 14 and 16 to pick up the heat from the fluidized bed in a conventional manner.

A plurality of fluidization nozzles, each referred to in general by the reference numeral 36, extend through openings formed in, and are supported by, the plate 24. Thus, the air from the plenum 26 enters each nozzle 36 and discharges from a horizontal discharge portion thereof into the bed 22. The velocity of the air from the nozzles 36 is such that the bed material extending above the horizontal nozzle portions is fluidized, and the air passes through the bed and rises, by convection, in the enclosure 10 before discharging, along with the gaseous products of combustion, from an outlet (not shown) in the upper portion of the enclosure. Also, a dormant layer of particulate material is formed around the nozzles 36 which acts to insulate the plate 24 from the heat generated in the heat exchanger extending above the nozzles 36.

Figure 2:
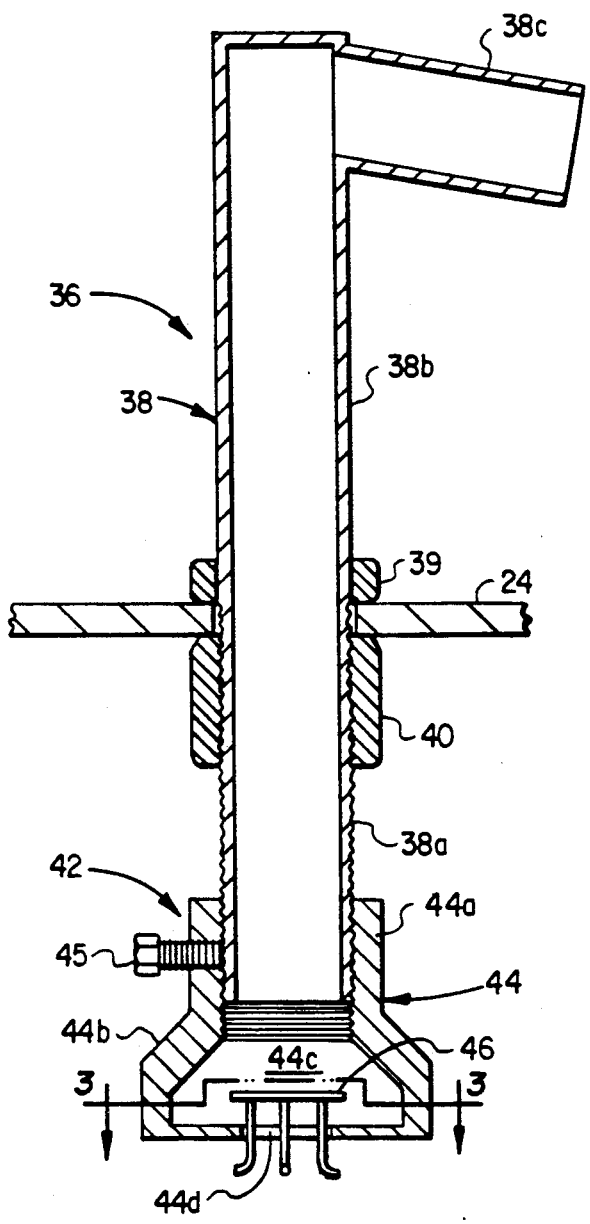
FIG. 2 is an enlarged, vertical sectional view of a fluidizing nozzle of FIG. 1, with the bed material omitted in the interest of clarity.
Figure 3:
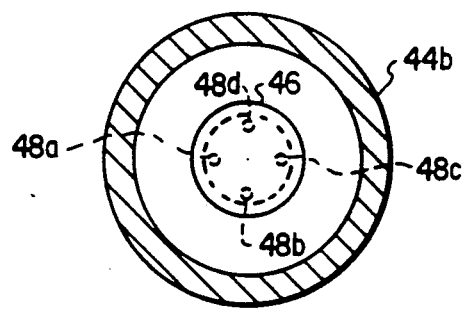
FIG. 3 is a cross-sectional view taken along the lines 3—3 of FIG. 2.

The details of a nozzle 36 are shown in FIGS. 2 and 3. Each nozzle 36 includes a vertical tubular portion 38 extending through a corresponding opening in the plate 24 and secured to the plate in any conventional manner such as by welding. The tubular portion 38 includes an externally threaded lower portion 38a projecting below the plate 24 for receiving air from the plenum 26, and an upper portion 38b extending above the plate and into the fluidized bed 22. The nozzle 36 also includes a discharge portion 38c registering with an opening formed through the upper end portion of the upper nozzle portion 38b. The discharge portion 38c extends downwardly at a slight angle to the horizontal. Thus, air travels upwardly through the nozzle portions 38a and 38b before entering the discharge portion 36c and discharging into the fluidized bed 22.

An upper ring member 39 is secured to the upper nozzle portion 38b and rests against the upper surface of the plate 24 to locate the nozzle in the position shown. An internally threaded sleeve 40 extends just below the plate 24 and in threaded engagement with the threaded lower nozzle portion 38a. After the nozzle 36 is inserted through the opening in the plate 24, the sleeve 40 can be advanced upwardly on the lower nozzle portion 38a until it engages the lower surface of the plate 24 to secure the nozzle 36 in the position shown.

A valve assembly 42 is connected to the lower end portion of the lower nozzle portion 38a. The assembly 42 includes a housing 44 having an upper cylindrical portion 44a and an enlarged hollow portion 44b extending from the cylindrical portion and defining a chamber 42c. A bolt 45 extends through an opening in the cylindrical portion 44a and in engagement with the lower nozzle portion 38a to secure the housing 44 to the nozzle 36.

A disc valve 46 is disposed in the chamber 44c and four rods 48a, 48b, 48c and 48d extend from its lower face. The rods 48a–48d extend through an opening 44d formed in the floor of the housing 44 and their respective free end portions are bent for approximately 90°. The rods 48a–48d function to provide guiding support for the disc valve 46 as it moves within the chamber 44c to control the flow of air into the chamber and prevent the backflow of particulate material from the nozzle 36 through the opening 46d, as will be explained. The rods 48a–48d also function to limit the upper movement of the disc valve 46 by virtue of the bent portions thereof engaging the outer surface of the floor of the housing 44 in the upper position of the valve 46.

In operation, the dampers 28 associated with the plenum 26 are opened and pressurized gas, such as air, passes through the duct 26a and the plenum and upwardly against the disc valves 46 of each of the nozzles 36. This forces the disc valves 46 upwardly and permits the air to enter the chamber 44c of each nozzle 36 via the opening 44d and pass into the end of the lower nozzle portion 38a. The air flows upwardly through the nozzle portions 38a and 38b and the discharge nozzle portion 38c before discharging into the bed 22 at a slightly downward discharge path above the plane of the plate 24.

The air passes through the bed 22 (FIG. 1) to fluidize it and then passes, by convection, through the enclosure 10 in a generally upwardly direction. Thus, that portion of the particulate material in the bed 22 extending immediately above the nozzle portions 38c is fluidized and the portion extending between the latter portion and the upper surface of the plate 24 remains dormant, or stagnant.

As shown in FIG. 1, the nozzles 36 are oriented so that their horizontal discharge portions 38c are directed towards the rear wall 14. Although not clear from the drawing, it is understood that the discharge portions 38c can also be directed towards the drain pipe 34. As a result of this orientation, a momentum is imparted to the bed material which induces a circulation of the material to insure superior distribution, mixing and draining of the particulate material as discussed in detail in the aforementioned U.S. Patent.

The light-off burner 32 and the burner in the duct 26a are then fired to heat the material in the bed until the temperature of the material reaches a predetermined level, and additional particulate fuel is discharged from the feeder 29 while adsorbent material is discharged onto the upper surface of the bed 22 as needed.

After the bed 22 has been fluidized and has reached a predetermined elevated temperature in accordance with the foregoing, the light-off burner 32 and the burner in the duct 26a are turned off while the feeder 29 continues to distribute particulate fuel to the upper surface of the bed in accordance with predetermined feed rates.

Fluid, such as water, to be heated is passed into the headers 34a and 34b where it passes simultaneously, or in sequence, through the tubes 18 forming the walls 12, 14 and 16 to add heat from the fluidized bed to the fluid before it is passed to external apparatus for further processing.

As a result of the foregoing, any bed material from the bed 22 tending to backflow through the nozzles 36 will force the disc valves 46 downwardly to a position where they cover their respective openings 44d and thus prevent further backflow of the particulate material into the plenum 26.

It is understood that the valve assembly 42 can be connected to fluidization nozzles of a different configuration than that discussed above, and the number and specific locations of the nozzles and their specific orientation can be varied as long as the above objectives and results are achieved. For example, the nozzles could be of one of the types disclosed in copending patent application Ser. No. 07/486,683 assigned to the assignee of the present invention.

Still other variations in the basic inventive concept discharged above can be made without departing from the scope of the invention. For example, the heat exchanger 10 can incorporate a circulating fluidized bed and the nozzle 36 and valve assembly 42 of the present invention can be used in other fluidized bed systems such as stripper coolers, J-valves, seal pots, etc. Also, the valve assembly 42 of the present invention could be fabricated as an integral portion of the nozzle 36.

Further modifications, changes and substitutions are intended in the foregoing disclosure and in some instances some features of the invention will be employed without a corresponding use of other features. According, it is appropriate that the appended claims be construed broadly and in a manner consistent with the spirit and scope of the invention therein.

What is claimed is:

1. A fluidized bed system comprising an enclosure, means for introducing particulate material into said enclosure, a plate disposed in said enclosure and adapted to support said particulate material, an air plenum located below said plate, a plurality of nozzles supported by said plate for receiving said air from said plenum and directing said air through said plate and into said particulate material to fluidize same, and each of said nozzles comprising a first portion extending substantially vertically from said plate for receiving said air from said plenum, and a second portion extending from said first portion at an angle thereto for directing and discharging said air into said particulate material in a downward direction, and valve means associated with each of said nozzles for permitting the flow of said air through said nozzles and preventing the flow of said particulate material from said nozzles to said plenum.

2. The system of claim 1 wherein each valve means comprises a housing communicating with the lower end of its respective nozzle, an opening in said housing communicating said housing with said plenum, and a valve member for selectively covering said opening.

3. The system of claim 1 wherein said valve member is a disc valve which normally moves in said housing under the force of said gas to expose said opening and permit air to flow through said opening and into said housing.

4. The system of claim 3 wherein said disc valve is forced against said opening to cover same under the force of particulate material to prevent the flow of particulate material through said opening.

5. A fluidization nozzle for use in fluidized bed system including an enclosure, means for introducing particulate material into said enclosure, a plate disposed in said enclosure and adapted to support said particulate material, and an air plenum located below said plate; said nozzle comprising a first tubular portion supported by said plate for receiving air from said plenum, an angled second tubular portion for directing said air through said plate and into said particulate material to fluidize same, and a valve means associated with said first tubular portion for permitting the flow of said air through said first tubular portion and preventing the flow of said particulate material from the said first tubular portion to said plenum.

6. The nozzle of claim 5 wherein said valve means comprises a housing communicating with the lower end of said tubular portion, an opening in said housing communicating said housing with said plenum, and a valve member for selectively covering said opening.

7. The nozzle of claim 6 wherein said valve member is a disc valve which normally moves upwardly in said housing under the force of said gas to expose said opening and permit air to flow through said opening and into said housing.

8. The nozzle of claim 7 wherein said disc valve is forced against said opening to cover same under the force of particulate material to prevent the flow of particulate material through said opening.

* * * * *